United States Patent [19]

Oyama et al.

[11] 4,349,877

[45] Sep. 14, 1982

[54] ELECTRONICALLY CONTROLLED CARBURETOR

[75] Inventors: Yoshishige Oyama, Katsuta; Hiroshi Kuroiwa, Hitachi, both of Japan

[73] Assignee: Hitachi, Ltd., Tokyo, Japan

[21] Appl. No.: 137,490

[22] Filed: Apr. 4, 1980

[30] Foreign Application Priority Data

Apr. 5, 1979 [JP] Japan .................................. 54-41733

[51] Int. Cl.³ ......................... F02M 7/18; F02M 7/24; G06F 15/20

[52] U.S. Cl. ............................... 364/431.05; 123/438; 123/439

[58] Field of Search ................ 364/431; 123/438, 439, 123/440, 568, 437

[56] References Cited

U.S. PATENT DOCUMENTS

| | | | |
|---|---|---|---|
| 4,050,428 | 9/1977 | Masaki | 123/438 |
| 4,187,814 | 2/1980 | Phelan et al. | 123/438 |
| 4,200,064 | 4/1980 | Engele | 123/440 |
| 4,226,222 | 10/1980 | Kohama et al. | 123/568 |
| 4,250,855 | 2/1981 | Kohama et al. | 123/438 |
| 4,250,856 | 2/1981 | Abbey | 123/439 |
| 4,280,462 | 7/1981 | Kuroiwa | 123/437 |

*Primary Examiner*—Felix D. Gruber

*Attorney, Agent, or Firm*—Craig and Antonelli

[57] ABSTRACT

An electronic controlled carburetor includes sensors for sensing engine speed, intake air pressure and water temperature. An arithmetic unit digitally processes output signals from the sensors and generates signals for controlling the air-fuel ratio of a mixture supplied to an engine on the basis of the output signals from the sensors. The carburetor system includes means for sensing atmospheric pressure and intake air temperature, and means for adjusting at least one of the amount of intake air of the engine and the amount of fuel. The arithmetic unit digitally processes the output signals from the atmospheric pressure and the intake air temperature sensing means to thereby produce a signal representing air density change and automatically controls at least one of the amount of intake air and fuel on the basis of the air density changing signal, to thereby control the air-fuel ratio of the mixture with higher accuracy.

4 Claims, 16 Drawing Figures

ELECTRONICALLY CONTROLLED CARBURETOR

BACKGROUND OF THE INVENTION

The present invention relates to a carburetor of a gasoline engine and, more particularly, to improvements in an electronically controlled carburetor.

In general, a conventional carburetor needs some adjustment for the unevenness of the carburetor characteristic depending on the accuracy of manufacturing of the low-speed fuel supply system or the main fuel supply system and the improper stoichiometric mixture ratio caused by aging due to the abrasion of a throttle valve shaft or accumulated dust in bleeds or metering orifices. One of the approaches to this adjustment uses an oxygen sensor attached to an exhaust pipe to sense the components of exhaust gas and to effect a feedback control for the adjustment. The approach, however, involves the following problems. It is difficult to effect feedback control in the operating region where the temperature of the exhaust gas is low, and also to apply feedback control to a mixture ratio other than the stoichiometric mixture ratio. In addition, the control response is relatively slow.

The conventional carburetor control takes advantage of the negative pressure that exists in the venturi. For this reason, when a car is driven at a high elevation where air density is low, the air-fuel ratio of the mixture will change.

SUMMARY OF THE INVENTION

Accordingly, an object of the invention is to provide an electronically controlled carburetor with a relatively simple structure in which an air density change of the air taken into the engine is measured and then the air-fuel ratio of the mixture is electronically controlled with high accuracy in accordance with the measured air density change.

To achieve the above object, there is provided an electronically controlled carburetor having means for sensing the number of revolutions (i.e. crankshaft rotation speed) of an engine, intake air pressure and water temperature, an arithmetic means for digitally processing the output signals from the sensing means and means for controlling the air-fuel ratio of a mixture supplied to the engine on the basis of the output signal from the arithmetic means. The electronically controlled carburetor particularly comprises means for sensing atmospheric pressure and intake air temperature and means for adjusting for at least one of the amount of intake air and the amount of fuel, whereby a signal representing air density change obtained by digitally processing the output signals from the sensing means for sensing atmospheric pressure and intake air temperature is produced, and the means for adjusting for at least one of the amount of the intake air and the amount of fuel is actuated on the basis of the air density change signal, to thereby control the air-fuel ratio of the mixture.

Other objects and features of the invention will be apparent from the following description taken in connection with the accompanying drawings in which:

DESCRIPTION OF THE PREFERRED EMBODIMENTS

Figure 1:
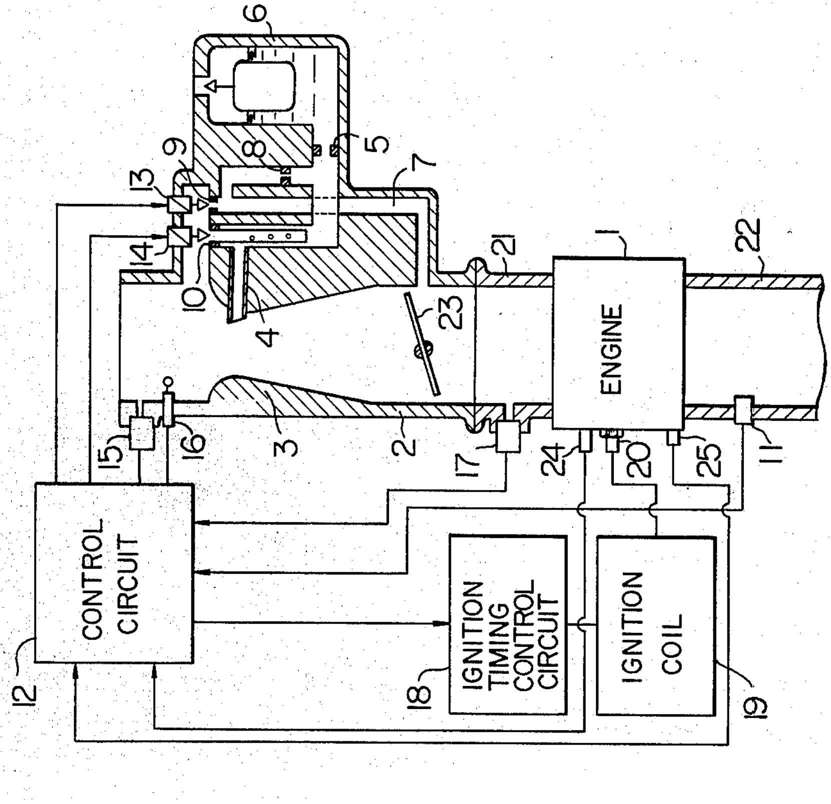
FIG. 1 is a cross sectional view of an electronically controlled carburetor which is an embodiment of the invention.

Referring now to FIG. 1, there is shown a cross-sectional view of an electronically carburetor of one embodiment of the invention. An engine 1 is coupled with an intake manifold 21 and an exhaust pipe 22. An intake passage 2 is mounted on the intake manifold 21. A main fuel supply system 4 has its port in a venturi section of the intake passage 2 and a low-speed fuel supply system 7 has its port in the vicinity of a throttle valve 23. As shown, an atmospheric pressure sensor 15 and an ambient temperature sensor 16 are attached to the upper portion of the venturi section 3 of the intake passage 2. An intake air pressure sensor 17 is attached to the intake manifold 21. The exhaust pipe 22 is provided with an oxygen sensor 11 attached thereto. The engine 1 is provided with a water temperature sensor 24 and an engine speed pick-up 25. Those output signals from the sensors are applied to a control circuit 12 where they are processed, and then the output signals from the control circuit 12 are applied to actuators 13 and 14 and an ignition timing control circuit 18. The ignition timing control circuit 18 energized an ignition coil 19 at a proper ignition timing to energize an ignition plug 20. The output signal Pa from the atmospheric pressure sensor 15 and the signal Ta from the ambient temperature sensor 16 are coupled into the control circuit 12 after being converted into digital signals.

Figure 2:
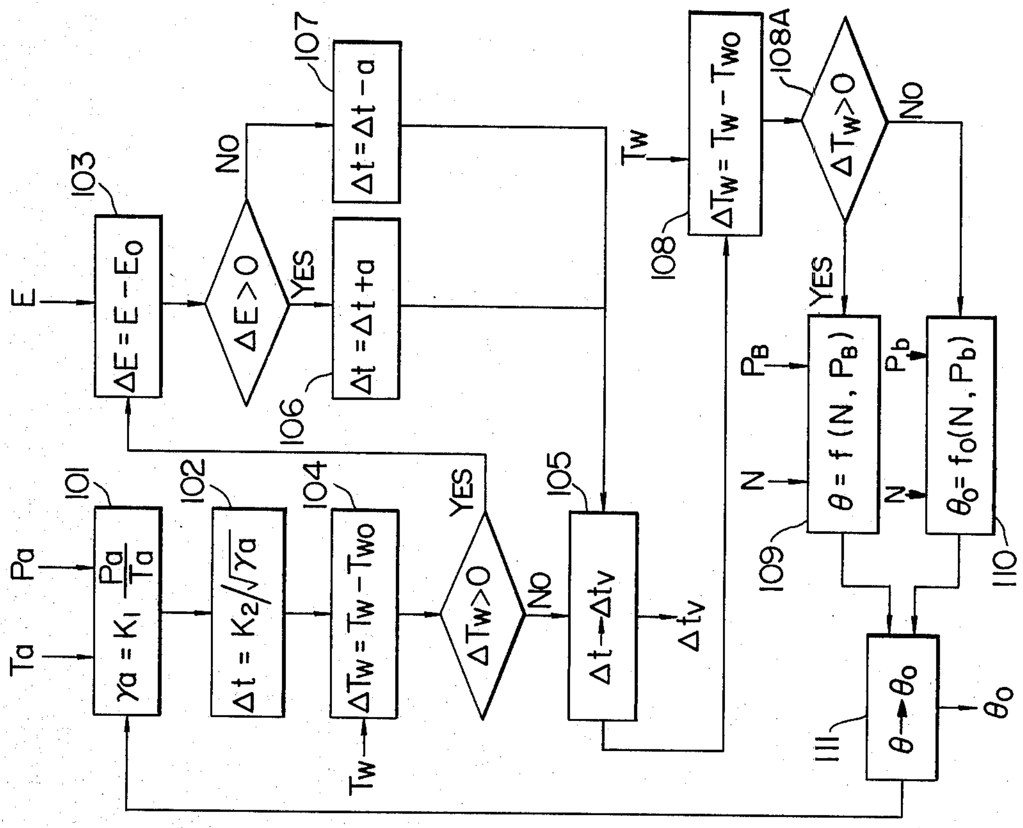
FIG. 2 is a flow chart for illustrating the control operation of the electronically controlled carburetor shown in FIG. 1.

FIG. 2 is a flow chart for illustrating the control operation of the electronic controlled carburetor shown in FIG. 1.

In the flow chart shown in FIG. 2, a block 101 computes air density $\gamma_a$. The actuators 13 and 14 are ON-OFF controlled by pulses at equal periods and the amount of fuel is adjusted by changing the ON period of time Δt of the actuators 13 and 14. In that case, as the ON period of time Δt becomes larger, the amount of fuel decreases. A block 102 computes the ON period of time Δt by using $\gamma_a$ and when $\gamma_a$ becomes smaller, the ON period of time Δt increases. A digital word representative of ON period of time Δt is transferred to a counter where it is counted down. In that case, the control circuit 12 produces a signal to turn on the actuators 13 and 14 until the counter counts down to zero, so that the ON period of the actuator may be controlled in proportion to the ON period of time Δt. The output signal E from the oxygen sensor 11 is compared with a reference value Eo in a block 103. When $\Delta E>0$, the mixture is rich and therefore the ON period of time Δt must be made large. In the embodiment of FIG. 1, the air to fuel ratio of the carburetor takes on a large value (namely, the mixture becomes lean) as the value Δt becomes large. On the other hand, the mixture becomes rich as the air density γa becomes large. Similarly, compensation for increasing Δt to provide a lean mixture is necessary when the output E of the $O_2$-sensor is larger than the reference value (namely, when the mixture is rich). A block 104 fetches the output signal $T_w$ from the water temperature sensor 24 and compares it with a reference value $T_{wo}$. When $\Delta T_w<0$, that is, the water temperature is low, a block 105 makes Δt equal to $\Delta t_v$ and the signal $\Delta t_v$ is used as control signals for the actuators 13 and 14. When $T_w>0$, Δt is corrected by ΔE. When ΔE is large, the mixture is thinned by increasing ΔT. When $\Delta E<0$, the fuel amount is increased by decreasing Δt and the feedback control is performed so that $\Delta E=0$. The output signal $T_w$ of the water temperature sensor 24 is coupled to the block 108 and, when $\Delta T_2>0$, as determined in block 108A a block 109 computes ignition timing θ. The ignition timing θ is given as a function of the intake pressure $P_B$ and the engine speed signal N and when $\Delta T_w<0$, the ignition timing $\theta_o$ is obtained in block 110 by using another function for low temperature. A block 111 computes the ignition timing $\theta_o$ for low temperature which in turn is applied to the ignition timing control circuit 18. The ignition timing may be obtained at the instant that the low temperature ignition timing $\theta_o$ is counted down to zero by a counter. Next, the above operation will be repeated after return to the block 101 from the block 111.

When an automobile with such an electronically controlled carburetor is operated at a high elevation or altitude, for example, the air density is measured by the atmospheric pressure sensor 15 and the ambient temperature sensor 16, so that the control circuit 12 produces a control signal. The control signal produced drives the actuators 13 and 14 to adjust the opening and closing periods of time of a low-speed air bleed 9 and a main air bleed 10. As a result, the weight ratio of the intake air and the fuel in the intake passage 2 supplied from the low-speed fuel supply system 7 and the main fuel supply system 4 is adjusted to automatically control the air-fuel ratio of the mixture supplied to the engine 1.

Figure 3:
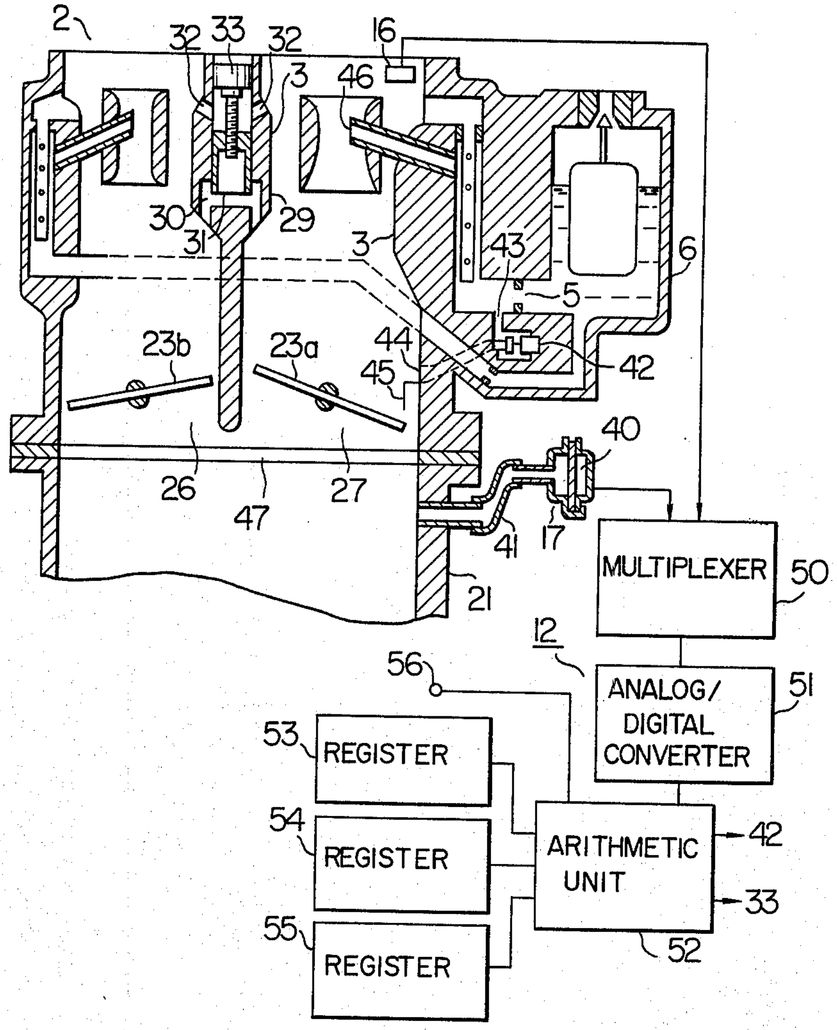
FIG. 3 is a cross-sectional view of an electronically controlled carburetor which is another embodiment according to the invention.

Turning now to FIG. 3, there is shown a cross sectional view of another embodiment of the electronically controlled carburetor according to the invention. The carburetor used is a two barrel type. In the figure, like reference symbols are used to designate like portions in FIG. 1. A partition section forming a venturi portion 3 for a primary intake passage 27 and a secondary intake passage 26 has air paths 29 and 30 which pass through the partition section. A cylindrical valve 31 is movably inserted into a hole communicating with the air paths 29 and 30 and is screwed to the rotor shaft of a pulse motor 33. In this way, an air density adjusting section is formed.

Figure 4:
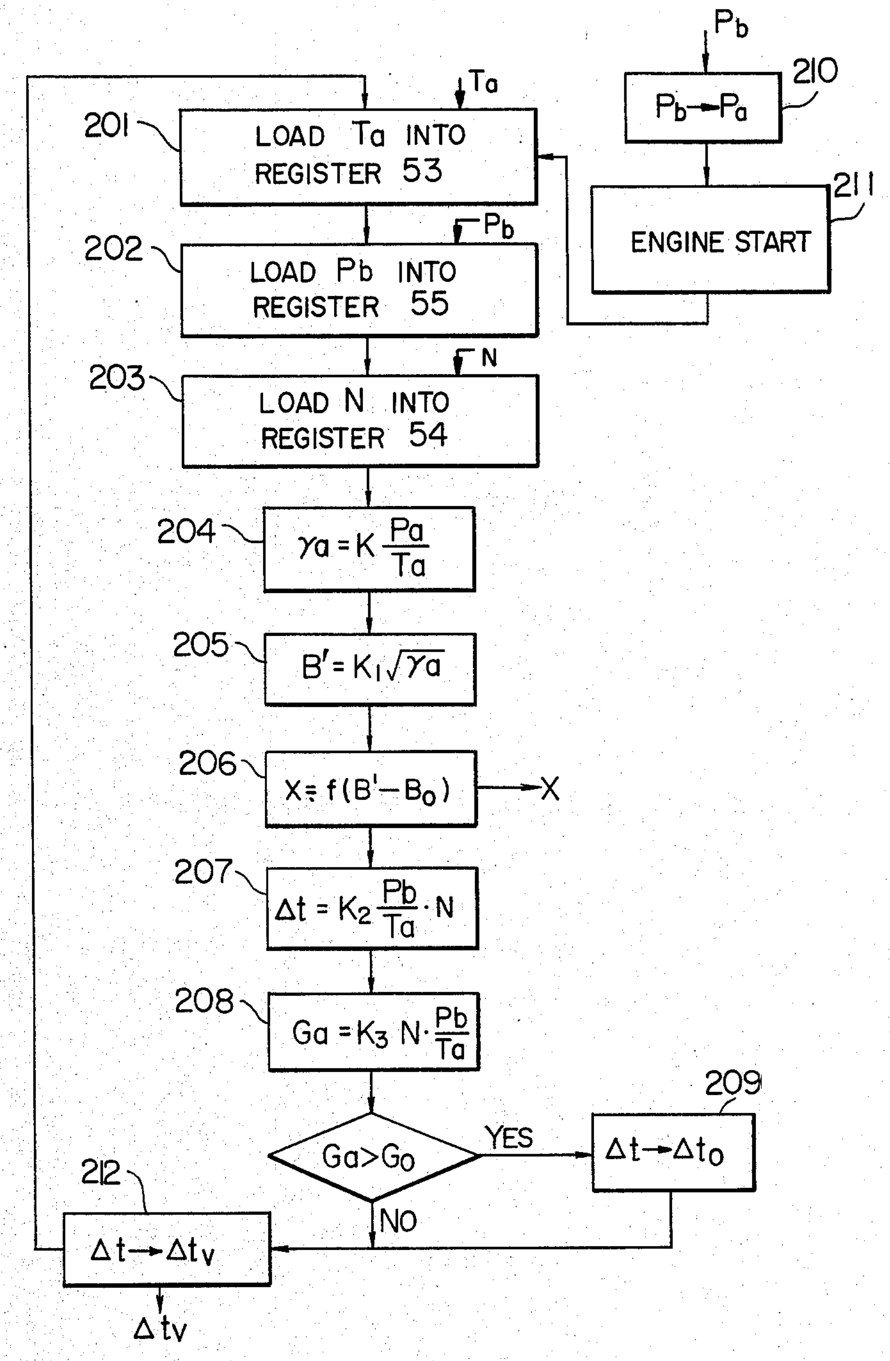
FIG. 4 is a flow chart for illustrating the control operation of the electronically controlled carburetor shown in FIG. 3.

FIG. 4 is a flow chart for illustrating the control operation of the electronically controlled carburetor shown in FIG. 3. The output signals from a temperature sensor 16 and an intake pressure sensor 17 are coupled to a multiplexer 50.

In the flow chart shown in FIG. 4, the output $P_b$ of the pressure sensor 17 is fetched as an input to the arithmetic unit 52 by way of the multiplexer 50 and A/D converter 51 during the time prior to the engine being started when the key/switch is actuated. The value fetched is stored within the RAM of the arithmetic unit 52. This step is illustrated as block 210 in FIG. 4. When the engine is started, the output of temperature sensor 24 is coupled through multiplexer 50 and A/D converter 51 and is loaded into register 53 as indicated by block 201. Similarly, the outputs of the pressure sensors 17 and speed pickup 25 are fetched and stored in respective registers 55 and 54 as designated by blocks 202 and 203.

At step 204, the air density γa is calculated by using the data TaPa previously obtained. At step block 205, the predetermined cross-sectional area B′ of the venturi portion 3 is calculated by using the calculated value of γa. In step 206, the control signal X is determined in accordance with the difference between the area B′ and the cross-sectional area $B_0$ of the venturi portion. This control signal X determines the opening of the air paths 29 and 30. In accordance with the deviation between the value X and the opening position of the valve 31, pulse motor 33 is driven by a prescribed amount in either the positive or the negative direction of rotation. In this manner, the air fuel ratio is prevented from being changed in accordance with the change in air density γa.

In the series of steps 207–212, the amount of fuel in the low-speed fuel supply system is controlled through the control of value 42 in the configuration shown in FIG. 3. The value Δt relating to the amount of intake air flow is calculated at step 207 and the amount of air Ga is calculated at step 208. The value Δt obtained in step 207 is delivered as an output at step 212 when the value of Ga<Go of constant value. When Ga>G0 the output value $\Delta t_o$ (a fixed value) is provided at step 209.

During the condition Ga<Go, the engine is idling and fuel is supplied to the engine through the slow pads 43 and 44, proportional to the amount of intake air flow. In accordance with this embodiment, accurately machined parts such as those required in the slow jet are not necessary because the slow-fuel supply is controlled by an electromagnetic value.

Figure 5:
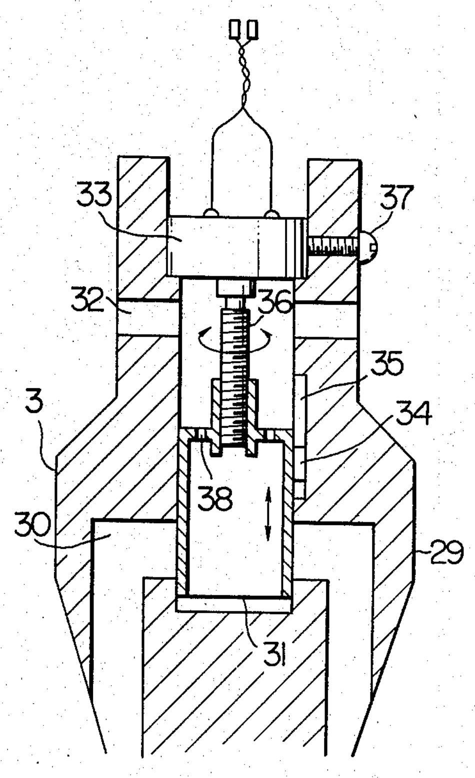
FIG. 5 is an enlarged cross sectional view of an air-density adjusting section used in the carburetor shown in FIG. 4.

FIG. 5 illustrates an enlarged cross-sectional view of the air density adjusting section shown in FIG. 3. The cylindrical valve 31 vertically inserted into the air paths 29 and 30, which pass through the venturi portion 3, has holes 38 and an internal thread on the upper portion. An external thread 36 formed at the rotor shaft of the pulse motor 33 is screwed into the internal screw of the cylindrical valve 31. With the rotation of the pulse motor 33, the cylindrical valve 31 moves up and down as viewed in the drawing. A projection 34 on the side wall of the cylindrical valve 31 is fitted in a groove 35 to prevent the rotation of the valve 31. The pulse motor 33 is locked by a screw 37. An air path 32 is provided upstream of the venturi portion 3. The air path 32, the hole 38 of the cylindrical valve 31, and the air paths 29 and 30 cooperatively form an air by-pass. The rotation of the pulse motor 33 adjusts the opening degree of each of air paths 29 and 30 thereby to adjust the amount of the intake air introduced through the air by-path and to adjust for the change of the air density. A pulse motor driving circuit for controlling the pulse motor 33 is supplied with a signal from the arithmetic unit 52 shown in FIG. 3.

Returning to FIG. 3, the sensing signals from the temperature sensor 16 and the intake air pressure sensor 17 are applied to the multiplexer 50. The air pressure sensor 17 is of the aneroid barometer type, for example and has a vacuum chamber 40 into which the pressure of the intake manifold 21 is introduced through a conduit 41 to sense absolute pressure and to convert it into a corresponding electrical signal.

Figure 6:
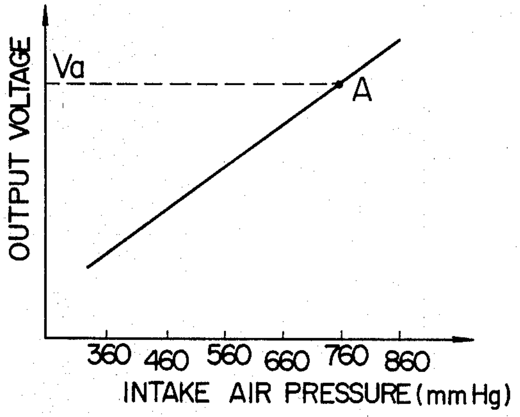
FIG. 6 is a graphical representation of the relationship between intake air pressure from an intake air pressure sensor and output voltage.

FIG. 6 is a graph illustrating the relationship between the intake air pressure of the intake air pressure sensor and the output voltage. A signal Va at a point A indicating the time of the stoppage of the engine represents the atmospheric pressure at that time. When the engine starts and the engine intake negative pressure of the intake manifold 21 increases, the output voltage from the intake pressure sensor 17 decreases.

The output signals from the sensors 16 and 17 coupled to the multiplexer 50 are converted into digital values by the A/D converter 51 and the converted digital values are transferred to the arithmetic unit 52 which contains microcomputer. The ambient temperature data processed by the arithmetic unit 52 is stored in the register 53 and the intake air pressure data is stored in the register 55. The engine speed signal from the engine 1 sensed by the engine speed pick-up 25 is transferred to the terminal 56 and is stored into the register 54 through the arithmetic unit 52. An air density $\Gamma_a$ is given by the following equation:

$$\Gamma_a/\Gamma_{ao}=P_a/P_{ao}\cdot T_{ao}/T_a \quad (1)$$

where

Ta is the temperature signal value of the register 53,

Pa is the intake pressure signal value of the register 55, $\Gamma_{ao}$ is atmospheric air density in a standard condition, $P_{ao}$ is atmospheric pressure in the standard condition, and $T_{ao}$ is atmospheric temperature in the standard condition.

Accordingly, the amount $G_a$ of the intake air is given by:

$$G_a=B\sqrt{2g\Delta P\cdot\Gamma_a} \quad (2)$$

where

B is the flow path cross-sectional area of the venturi portion, and $\Delta P$ is the negative pressure of the venturi portion g is acceleration due to gravity.

When B is set so that the negative pressure $\Delta P$ occurring at the venturi portion for the intake air amount $G_a$ in the standard condition is equal to $\Delta P_s$, equation (2) we have $$G_a=B\sqrt{2g\Delta P_s\cdot\Gamma_{ao}} \quad (3)$$

In the equation (3), when the air density $\Gamma_{ao}$ changes to $\Gamma_a$, to secure $\Delta P_s$, the air amount Ga is $$G_a=B'\sqrt{2g\Delta P_s\cdot\Gamma_a} \quad (4)$$

and $$B'/B=\sqrt{\Gamma_{ao}/\Gamma_a}=\sqrt{P_{ao}/P_a\cdot T_a/T_{ao}} \quad (5)$$

As seen from equation (5), the cross-sectional area B' of the flow path at the venturi portion 3 must be obtained. In other words, it is obtained by changing the area B of the flow path at the venturi portion 3 shown in FIG. 3 to B'.

As described above, the carburetor 2 is provided with an air density adjusting section. When the cross sectional areas of the air-paths 29 and 30 are expressed by X, the following expression is obtained from equation (5):

$$(X+B)/(X_o+B)=\Gamma_{ao}/\Gamma_a \quad (6)$$

Figure 7:
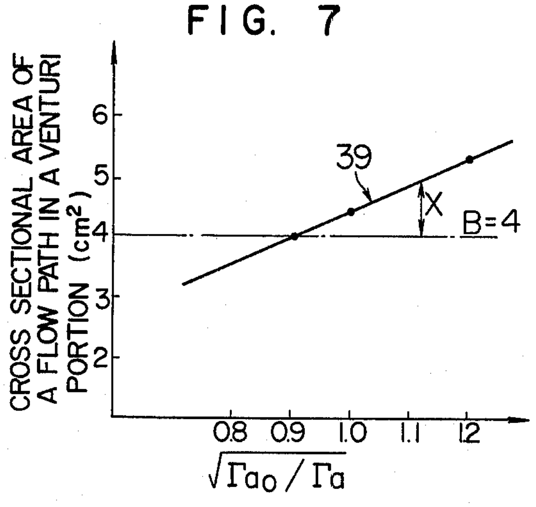
FIG. 7 is a graphical representation of the relationship between the air density change and an cross sectional area of the path of a venturi.

When $B=4$ cm$^2$ and $X_o=0.4$ cm$^2$, $X=1.28^2$ if $\sqrt{\Gamma_{ao}/\Gamma_a}=1.2$. FIG. 7 shows a graph for illustrating the relationship between a change in the air density and the flow path cross sectional area in the venturi portion. In the graph, the abscissa represents a change of the air density $\sqrt{\Gamma_{ao}/\Gamma_a}$ and the ordinate represents the flow path cross section of the venturi portion in cm$^2$. As can be seen from the calculation example, when $B=4$ cm$^2$, X+B linearly changes like a straight line 39. When atmospheric pressure falls, as for higher elevation operation of the car or during a high temperature season, for example, the cylindrical valve 31 may be raised, to thereby increase the flow path cross section area and to adjust the amount of intake air.

The straight line 39 is depicted in a condition that, when X=0, $\sqrt{\Gamma_{ao}/\Gamma_a}$ is set at 0.9. Therefore, when $\Gamma_{ao}=\Gamma_a$, the mixture is enriched by about 10%. Accordingly, it is possible to enrich the mixture at acceleration and starting of the engine running on flat ground, for example, when the just mentioned result is utilized. In other words, when the air density adjusting section is operated, the amount of intake air changes, so that it is possible to control the air-fuel ratio of the mixture.

In FIG. 3, the fuel path 43 communicates with an outlet 44 in the vicinity of the throttle valve 23*a* after it branches downstream of the main metering orifice 5, and changes the degree of the opening thereof by the electromagnetic valve 42. A guide plate 45 is attached to the lower side of the outlet 44, which facilitates evaporation of the fuel by preventing the fuel from adhering to the wall surface of the primary intake passage 27. The fuel path 43 constitutes a low-speed fuel supply system and the electromagnetic valve 42 is controlled with respect to its valve opening period of time by the signal from the arithmetic unit 52.

The opening period of time Δt of the valve 42 is expressed by $$\Delta t = K \cdot P_b / T_a \quad (7)$$

where
Pb is the intake air pressure by the engine,
Ta is air temperature, and
K is a constant.

Accordingly, the amount $L_{fs}$ of fuel supplied from the outlet 44 through the fuel path 43 to the engine is given by:

$$L_{fs} = \Delta t \cdot n \cdot K' = K \cdot K' n P_b / T_a \propto G_a \quad (8)$$

where n is the speed of the engine crankshaft. The valve 42 is opened once per one revolution of the engine crankshaft. Since the valve 42 opens in response to the signal from the arithmetic unit 52, that is, in proportion to the engine crankshaft speed, the amount of fuel in the low-speed fuel supply system is also proportional to the amount $G_a$ of the intake air to the carburetor 2.

Although the above-mentioned example is designed to open the electromagnetic valve 42 for a given period of time for every revolution of the engine crankshaft, the duty ratio control is alternatively allowed in which the opening operation of the valve 42 is performed at fixed intervals and the valve opening time ratio may be determined so as to be proportional to the amount $G_a$ of the intake air. Accordingly, the following equation also holds, $$\Delta t = K \cdot Ga \quad (9)$$

Alternatively, the valve opening period of time of the valve 42 may be fixed and then the period of the valve opening may be determined so as to be proportional to the amount $G_a$ of the intake air, to thereby reduce it. As a modification, the fuel path 43 in FIG. 3 may communicate with the upstream side of the main metering orifice 5.

Figure 8:
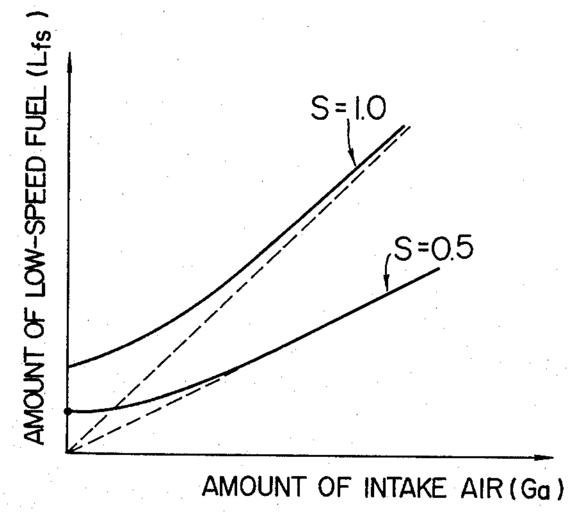
FIG. 8 is a graph illustrating the relationship between an intake air amount Ga and the amount of a low-speed fuel $L_{fs}$.

The explanation to follow is for the control of the low-speed fuel amount by adjusting the opening degree of the electromagnetic valve 42. FIG. 8 graphically illustrates the relationship between the intake air amount $G_a$ and the low-speed fuel amount $L_{fs}$. The graph is depicted with the opening area S of the valve 42 as a parameter. In that case, the valve 42 used has a needle valve and the stopping position of the needle valve is adjusted by the arithmetic unit 52. The low-speed fuel amount $L_{fs}$ is expressed by:

$$L_{fs} = S\sqrt{2g(\Delta P + \Gamma_f H) \cdot \Gamma_f} \quad (10)$$

where H is a height of the liquid level in the float chamber 6, ΔP is a negative pressure of the venturi portion as shown in the equation (2), and $\Gamma_f$ is fuel density. The relationship of ΔP is shown in equation (2). Substituting the equation (2) into the equation (10), we have $$\frac{L_{fs}^2}{\Gamma_f \cdot 2g \cdot S^2} = \frac{G_a^2}{B^2} \cdot \frac{1}{2g \cdot \Gamma_a} + \Gamma_f \cdot H \quad (11)$$

Accordingly,

-continued $$S^2 = \frac{L_{fs}^2}{\Gamma_f \cdot 2g\left(\frac{G_a^2}{B^2 2g\Gamma_a} + \Gamma_f \cdot H\right)} \quad (12)$$

Therefore it is obtainable by adjusting S with respect to $G_a$, so that the ratio $L_{fs}/G_a$ is constant. In this manner, the proportionality of $G_a$ and $L_{fs}$ may be improved.

Explanation will now be presented of the control at the operation time that the intake air amount $G_a$ increases and the fuel is supplied from the main nozzle 46 to the engine. When the intake air amount $G_a$ of the carburetor 2 increases up to a given value, the signal to the electromagnetic valve 42 is maintained to fix the fuel amount supplied from the low-speed fuel supply system. When the intake air amount $G_a$ increases above that, the main fuel supplied at the venturi portion 3 is supplied from the main nozzle 46. Also, at that time, the adjustment for the air density is performed by the air density adjusting section. That is, the position of the cylindrical valve 31 is automatically adjusted by the pulse motor 33. At that time, the cylindrical valve 1 is positioned corresponding to a fixed amount of fuel supplied from the low-speed fuel supply system, so that the amount of the air supplied through the bypass is adjusted. If so done, the venturi negative pressure ΔP decreases, so that the timing of the start of the fuel supply by the main nozzle 46 may be adjusted. In order to directly change that timing an electromagnetic valve is installed at the outlet of the main nozzle 46 and is opened and closed by the signal from the arithmetic unit 52.

Figure 9:
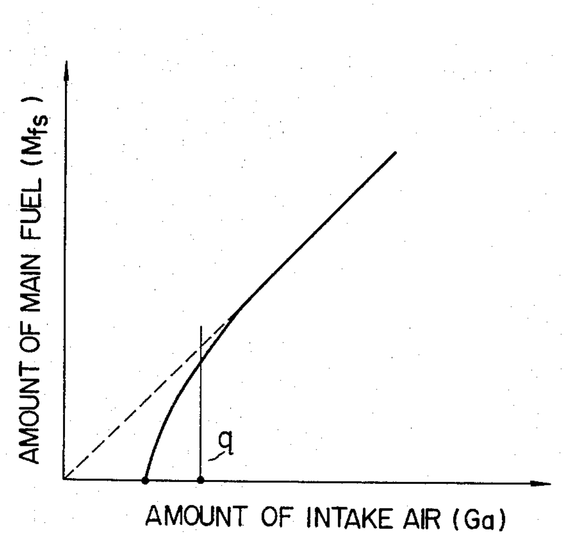
FIG. 9 is a graph illustrating the relationship between the amount Ga of the intake air and amount $M_{fs}$ of main fuel.

FIG. 9 illustrates the relationship between the intake air amount $G_a$ and the main fuel amount $M_{fs}$. As shown, when the intake air amount $G_a$ decreases, the main fuel amount $M_{fs}$ is rapidly reduced and its proportionality is not maintained. This may be improved by adjusting the position of the cylindrical valve 31 as described above, or by closing the outlet of the main nozzle 46 at a point q, for example, by means of the electromagnetic valve installed at the outlet of the main nozzle 46. In the latter case, only low-speed fuel inflow is allowed.

In design, the electronically controlled carburetor as described above has the air density adjusting section at the venturi portion as shown in FIG. 2. The values sensed by the temperature sensor, the intake pressure sensor and the engine speed pick-up are properly processed by the arithmetic unit and the signals from the arithmetic unit control the electromagnetic valve installed at the low-speed fuel path and the position of the cylindrical valve in the air density adjusting section. In this way, the air-fuel ratio of the mixture supplied to the engine may be properly controlled. The number of sensors attached to the carburetor may be reduced by half in the embodiment of the invention, leading to a simple and low cost device. Because an exhaust sensor is not used, the response of the device is good.

Figure 10:
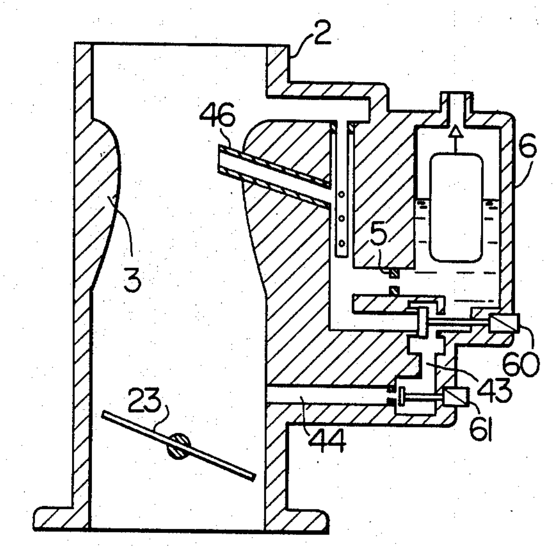
FIG. 10 is a schematic diagram of an electronically controlled carburetor which is still another embodiment of the invention.

A scheme of another embodiment of the carburetor of the invention is illustrated in FIG. 10 in which like symbols are used to designate like portions in FIG. 3. The carburetor 2 has a change-over valve 60 on the low-speed fuel path 43 so as to change over the fuel paths from the upstream part and the downstream part of the main metering orifice 5. The fuel path 43 has a control valve 61 to adjust the opening thereof. The change-over valve 60 and the control valve 61 are coupled with the arithmetic unit 52 shown in FIG. 3. The output signals from the unit 52 control those valves.

In low-speed operation, the change-over valve 60 pulls a valve member at the top end to couple the downstream part of the main metering orifice 5 with the fuel path 43. At that time, the control valve 61 controls the low-speed fuel amount $L_{fs}$. When the intake air amount $G_a$ of the carburetor 2 increases to reach a given amount, the change-over valve 60 pushes the valve member as shown in FIG. 10 to couple the upstream part of the main metering orifice 5 with the fuel path 43. At that time, the control valve 61 corrects the main fuel. In other words, when the density of the mixture must be high in such a case as warming-up, engine restart or acceleration, the control valve is largely opened for complying with the situation.

When a large amount of the fuel is required, for example, at the time of engine starting at low temperature, the change-over valve 60 is operated so that the fuel path 43 is made to communicate with the upstream part of the main metering orifice 5 in the region where the intake air amount $G_a$ is relatively small. These operations are all performed under the control of the commands from the arithmetic unit.

Generally, at the acceleration time, the amount of fuel supplied from the main metering orifice 5 is large, so that it takes a long time for the fuel supply from the main metering orifice 5 and thus the fuel supply is delayed. On the other hand, the embodiment of the invention can rapidly supply fuel by opening the low-speed fuel path 43. In this respect, the above defect is eliminated. Assume now that the opening area of the control valve 61 is 0.28 $mm^2$ (corresponding to an orifice having a diameter of 0.6 mm $\phi$) and the difference between the liquid level in the float chamber 6 and the control valve 61 is 30 mm. In that case, the fuel of 0.6 l/h passes the control valve 61. When the opening valve area is 1.13 $mm^2$ (corresponding to an orifice having a diameter of 1.2 mm $\phi$), the fuel of 2.4 l/h flows. Within this range, if the opening degree of the control valve 61 is changed, the supply amount of the fuel at the acceleration time may be secured. That is, when the diameter of the main metering orifice 5 is 1.0 mm $\phi$, double the amount of fuel may be supplied to the engine when the control valve 61 is opened, compared to that when it is not opened. This amount of fuel is sufficient for low-speed start.

In the case of warming-up the engine at low temperature engine starting, if the control valve 61 is fully opened, as mentioned above, the fuel flow is 2.4 l/h, so that the idle air amount may be increased up to four times and, at the cranking time with the half of the idle air amount, the fuel amount is 8 times. Therefore, a sufficient amount of fuel may be supplied to the engine even at the warming-up time.

Although FIG. 10 does not specifically illustrate any particular sensor, it should be observed that an ambient temperature sensor 16, an intake air temperature sensor 17, and an engine speed pick-up are actually provided. Steps 210 and 211 illustrated in FIG. 4, described above, are employed as previous stage steps prior to step 301 of FIG. 11, so that in the stage prior to engine start up, a signal $P_b$ from the pressure sensor 17 is loaded as an ambient pressure signal valve in RAM (not shown) within unit 12. When the engine is started, signals from sensors 16 and 17 are fetched and loaded into registers 53, 55 and 54 as respectively indicated by steps 301-303.

Then, as illustrated in block 304, the air density $\gamma b$ in the suction tube (namely the downstream end of the throttle value) and the value of the intake air flow Ga as calculated using the values n and $\gamma a$. At step 308, valve 60 is in its OFF state, when $Ga > Go$, namely the position of the valve 60 is in a position as shown in FIG. 10. Then, at step 309, a control signal $\Delta t$ to be supplied to valve 61 so as to compensate for a change in the ambient pressure is calculated. During the OFF state of valve 60, it is determined whether the compensation fuel path 43 and 44 into which valve 60 is insert is parallel with the main orifice 5, so that the amount of fuel to be supplied to the engine may be increased as the opening of the main orifice 5 is increased. Then, a change in the air fuel ration due to change in air density can be compensated by changing the value $\Delta t$ in accordance with the ratio Pa/Ta, since, in the region $Ga > Go$ at the outlet of the compensation path 44, a negative pressure is produced related to the amount of intake air flow.

For the condition $Ga < Go$ valve 60 is turned ON at step 306, with the path 43, 44 being connected to the downstream side of the main orifice 5, and the control signal $\Delta t$ to be applied to valve 61 being calculated by using the value Ga at step 307.

By using the absolute pressure sensor as an intake negative pressure sensor, as illustrated in FIG. 3, the amount of intake air flow Ga irrespective of the ambient (atmospheric) air pressure can be derived, so that the correct amount of fuel based upon the compensation of the atmospheric air pressure can be obtained by calculating the control value $\Delta t$ according to the value Ga. Where $Ga < Go$, the negative pressure acting on the outlet of the compensation path 43, 44 is approximately constant, so that the compensated fuel is proportional to the value Ga. As a result, the air fuel ratio in the slow speed fuel system can be made constant.

In steps 310-313, the fuel is increased during a low temperature condition. The deviation $\Delta t_w$ between the temperature of the coolant and the reference value $T_{wo}$ is obtained at step 310. Where $\Delta Tw > o$, the value $\Delta t$ is produced as an output. Where $\Delta Tw < o$, an increment coefficient $K_{20}$ corresponding to the absolute value of the deviation $\Delta Gw$ is calculated at step 311. Then, the value $\Delta t$ $(=K_{20} \cdot \Delta t)$ is delivered as an output of step 313.

Figure 11:
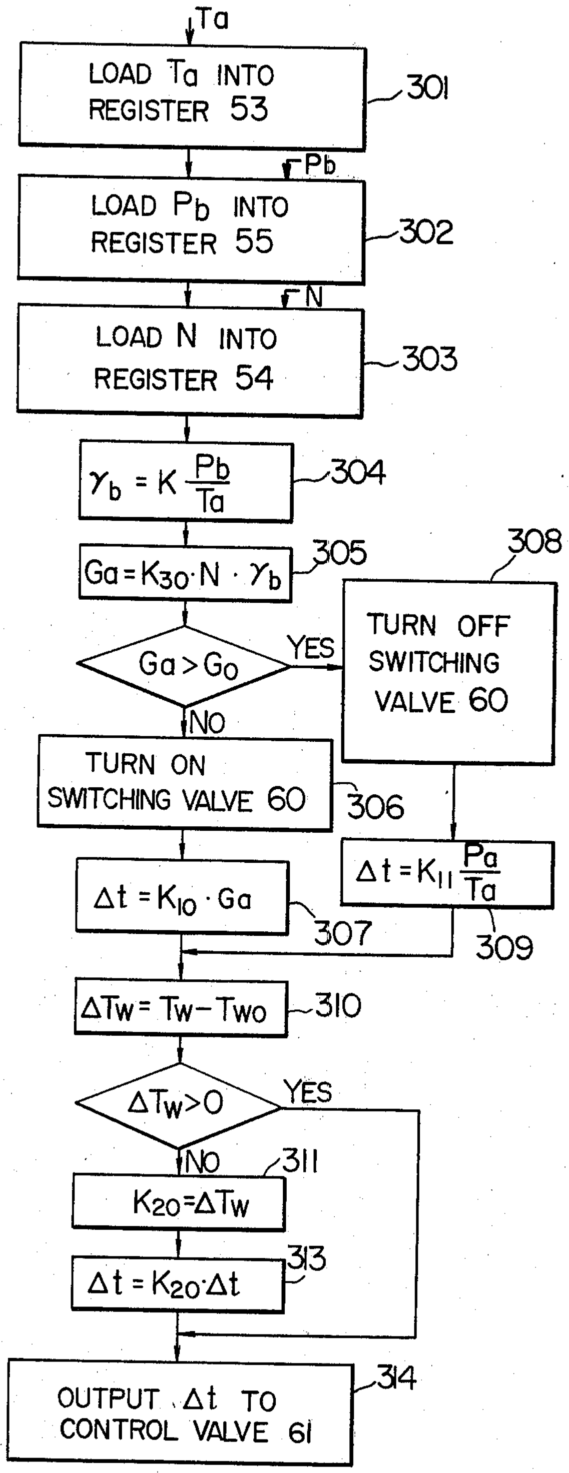
FIG. 11 is a flow chart for illustrating the control operation of the carburetor shown in FIG. 10.

In summary, in accordance with the flow chart shown in FIG. 11, where the engine operational state requires a large amount of intake air, the compensation of the atmospheric pressure can be achieved by changing the amount of fuel flowing in the fuel path provided as a by pass for the main orifice 5 by controlling the valve 61 in accordance with the value $\Delta t$ obtained from the calculation at step 309. On the other hand, where the engine operation condition requires less intake air, namely during idling, the compensation for atmospheric pressure can be achieved by employing the negative intake pressure Pb from the absolute pressure sensor is a factor for determining slow fuel delivery.

Figure 12:
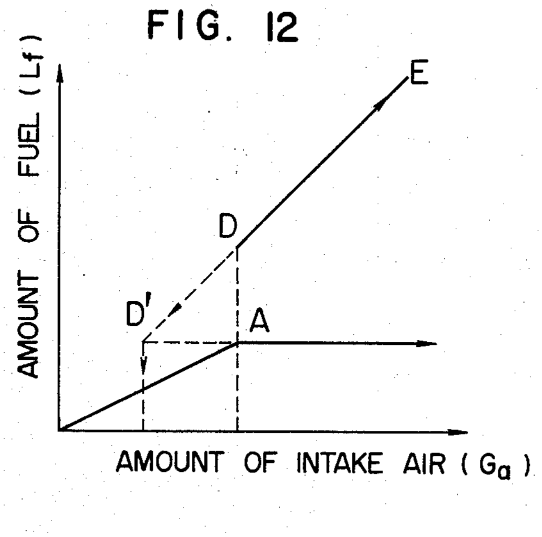
FIG. 12 is a graphical expression illustrating the relationship between the amount Ga of intake air into the carburetor shown in FIG. 10 and the amount of low-speed fuel and main fuel.

FIG. 12 shows a graph illustrating the relationship between the intake air amount $G_a$ of the electronically controlled carburetor and the low-speed fuel amount and the main fuel amount. As can be seen from the graph, when the open area of the control valve 61 increases, the low-speed fuel amount $L_{fs}$ increases proportionally to the intake air amount $G_a$ as indicated by a straight line OA. After reaching a point A, it is maintained at a fixed value since the opening degree of the control valve 61 is held. At that time, when the change-over valve 60 is switched over and the communicating path between the float chamber 6 and the control valve 61 is closed, the fuel, after it passes through the main metering orifice 5, is supplied to the engine, as indicated by a line DE. Under this condition, if the amount $G_a$ of the intake air is reduced, the main fuel is reduced as indicated by a line DD', so that only the low-speed fuel is left.

Figure 13:
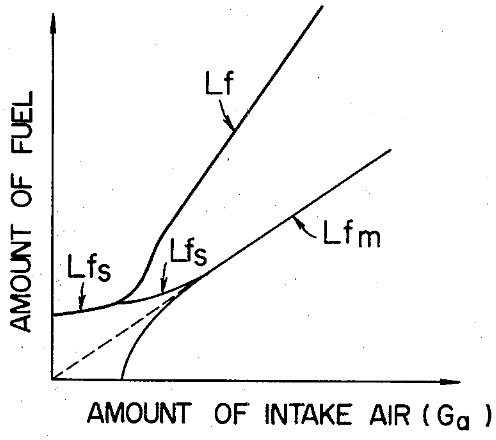
FIG. 13 is a graph illustrating the relationship between the sum amount of the fuel in FIG. 12 and the amount Ga of intake air.

FIG. 13 shows the relationship between the sum amount of fuel shown in FIG. 12 and the amount $G_a$ of the intake air, in which the sum of the low-speed fuel amount $L_{fs}$ and the main fuel amount $L_{fm}$ is expressed by a bold line denoted as $L_f$. As depicted in FIG. 13, the line $L_f$ has a remarkable downward curved portion in the regional portion where the $L_f$ shifts to the low-speed fuel $L_{fs}$ but the remaining portion of the line $L_f$ has a substantially smoothed inclination, as shown. The shape of the curve $L_f$ may be reshaped by adjusting the intake air amount $G_a$ for actuating the change-over valve 60 and the maximum opening of the control valve 61.

In the electronically controlled carburetor of the above-mentioned embodiment, a change-over valve is provided on the low-speed fuel path. With the provision of the switch valve, in a low-speed operation of the engine, low-speed fuel is directly supplied from the float chamber to the engine while, in a high speed operation, the main fuel and the low-speed fuel are supplied through the main metering orifice to the engine. The output signal from the arithmetic unit controls the opening of the control valve installed in the low-speed fuel path and the switching timing of the change-over valve. In this way, the air-fuel ratio of the mixture supplied to the engine is controlled optimally.

Figure 14:
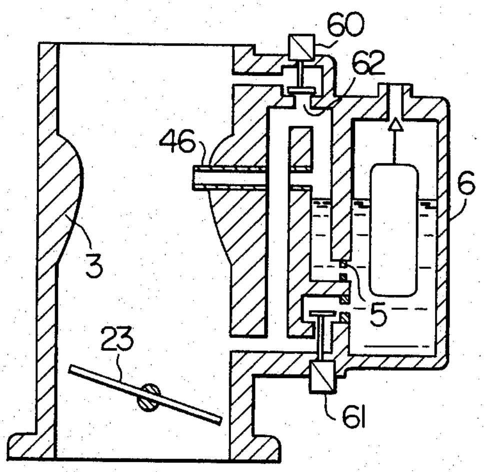
FIG. 14 is a schematic diagram of an electronically controlled carburetor which is a modification of the carburetor shown in FIG. 10.

FIG. 14 shows a scheme of the electronically controlled carburetor which is a modification of that shown in FIG. 10. The difference of the carburetor from that shown in FIG. 10 resides in that the change-over valve 60 is used for opening and closing the air bleed 62.

Figure 15:
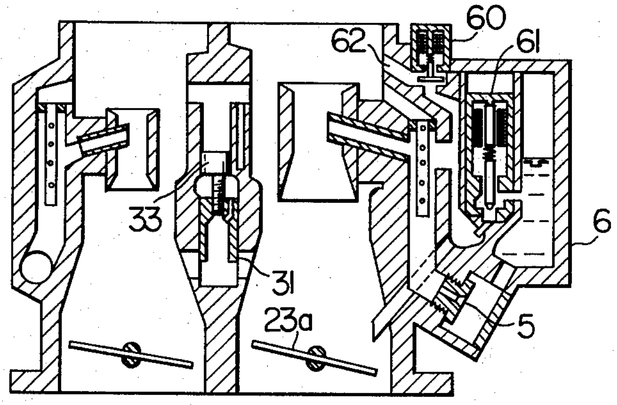
FIG. 15 is a cross-sectional view of the electronically controlled carburetor of the type shown in FIG. 14.

FIG. 15 is a cross-sectional view of the electronically controlled carburetor shown in FIG. 14. The change-over valve 60 is installed in the air bleed path communicating with the low-speed fuel supply system and the main fuel supply system. A control valve 61 of the needle valve type is installed in the fuel path between the float chamber 6 and the low-speed fuel supply system.

Figure 16:
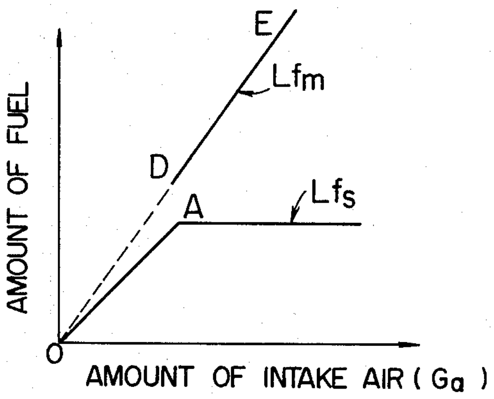
FIG. 16 is a graph illustrating the relationship between the amount of the intake air into the electronically controlled carburetor shown in FIG. 15 and the amount of fuel.

With such a construction of the electronically controlled carburetor, when the flow path of the air bleed 62 is closed by the change-over valve 60, the low-speed fuel amount increases proportionally to the intake air amount $G_a$, as indicated by a curve OA shown in FIG. 16. When the intake air amount $G_a$ reaches a given value, the opening of the control valve 61 is held constant to prevent the fuel amount from increasing even if the intake air amount $G_a$ is increased. When the change-over valve 60 is operated to release the path of the air bleed 62, the main fuel is supplied from the main nozzle 46 and the amount of the fuel supplied increases proportionally to the intake air amount $G_a$, as indicated by a line DE. The sum of the low-speed fuel amount $L_{fs}$ and the main fuel amount $L_{fm}$ changes as shown in FIG. 13. The inclination of the curve representing the total fuel amount may be changed by adjusting the cross sectional area of the flow path of the main metering orifice 5 and the opening area of the control valve 61.

As described above, the above-mentioned embodiment opens and closes the air bleed hole by the change-over valve, and the switching timing and the opening of the change-over valve, which is provided in the low-speed fuel path directly communicating with the float chamber, by the output signal from the arithmetic unit. In this way, the fuel-air ratio of the mixture supplied to the engine is optimumly controlled.

As described above, the electronically controlled carburetor according to the invention uses a cylindrical valve for adjusting for the intake air amount provided in the venturi portion and a control valve provided in the low-speed fuel path, and adjusts the openings of the cylindrical valve and the control valve by an output signal from the arithmetic unit where the atmospheric temperature, the intake air pressure and the engine speed, which are sensed by the corresponding sensors, are properly processed. With such a construction, the air-fuel ratio of the mixture may be controlled with a lesser number of sensors, good response, and high accuracy.

What is claimed is:

1. An electronically controlled carburetor system for controlling the air-fuel mixture supplied by a carburetor to an internal combustion engine comprising:

sensor means for sensing prescribed characteristics of selected physical parameters related to the operation of the engine;

control means for controlling at least one of the amount of intake air and the amount of fuel supplied to the engine; and processing means, responsive to output signals produced by said sensor means representative of said prescribed characteristics, for generating an output signal representative of a change in the density of the air taken into the engine, said output signal being coupled to said control means whereby said at least one of the amount of intake air and the amount of fuel supplied to the engine is controlled in accordance with said change in air density; and wherein said carburetor comprises a venturi portion containing a primary intake passage and a secondary intake passage and wherein said control means comprises an air density adjusting section disposed in said venturi portion and separating said primary intake passage from said secondary intake passage and including a first air path which couples said primary intake passage with said secondary intake passage, a second air path which communicates with said first air path and opens to the upstream side of said venturi portion, and a cylindrical valve which is slidably moveable within said second air path by a pulse motor, the output signal from said processing means being coupled to said pulse motor for moving said cylindrical valve and thereby changing the cross-section area of the flow path of said first air path, to thereby control the amount of intake air supplied to the engine.

2. An electronically controlled carburetor system for controlling the air-fuel mixture supplied by a carburetor to an internal combustion engine comprising:

sensor means for sensing prescribed characteristics of selected physical parameters related to the operation of the engine;

control means for controlling at least one of the amount of intake air and the amount of fuel supplied to the engine; and processing means responsive to output signals produced by said sensor means representative of said prescribed characteristics, for generating an output signal representative of a change in the density of the air taken into the engine, said output signal being coupled to said control means whereby said at least one of the amount of intake air and the amount of fuel supplied to the engine is controlled in accordance with said change in air density; and wherein said control means comprises an electromagnetic valve, to which said output signal is coupled, provided in a low-speed fuel path branching from the downstream part of a main metering orifice of said carburetor, and wherein said processing means generates said output signal so as to increase the duration of the opening of said electromagnetic valve until the amount of intake air reaches a prescribed quantity and thereafter maintaining the duration of opening of said valve constant.

3. An electronically controlled carburetor system for controlling the air-fuel mixture supplied by a carburetor to an internal combustion engine comprising:

sensor means for sensing prescribed characteristics of selected physical parameters related to the operation of the engine;

control means for controlling at least one of the amount of intake air and the amount of fuel supplied to the engine; and processing means, responsive to output signals produced by said sensor means representative of said prescribed characteristics, for generating an output signal representative of a change in the density of the air taken into the engine, said output signal being coupled to said control means whereby said at least one of the amount of intake air and the amount of fuel supplied to the engine is controlled in accordance with said change in air density; and wherein said control means comprises a change-over valve for closing either one of two low-speed fuel paths branched from respective upstream and downstream parts of a main fuel metering orifice of said carburetor, and a control valve for adjusting the amount of low-speed fuel after it passes through said change-over valve, and wherein said processing means selectively couples said output signal to said change-over valve and said control valve so that, as long as the amount of intake air is less than a prescribed quantity, said output signal causes said change-over valve to open the low-speed fuel path extending from the downstream part of said main fuel metering orifice and causes the degree of opening of said control valve to increase, and upon said amount of intake air reaching said prescribed quantity, said output signal causes said change-over valve to open the low-speed fuel path extending from the upstream part of said main fuel metering orifice and causes the degree of opening of said control valve to remain unchanged.

4. An electronically controlled carburetor system for controlling the air-fuel mixture supplied by a carburetor to an internal combustion engine comprising:

sensor means for sensing prescribed characteristics of selected physical parameters related to the operation of the engine;

control means for controlling at least one of the amount of intake air and the amount of fuel supplied to the engine; and processing means, responsive to output signals produced by said sensor means representative of said prescribed characteristics, for generating an output signal representative of a change in the density of the air taken into the engine, said output signal being coupled to said control means whereby said at least one of the amount of intake air and the amount of fuel supplied to the engine is controlled in accordance with said change in air density; and wherein control means comprises a control valve provided in a low-speed fuel path directly communicating with a float chamber of said carburetor and a change-over valve for opening and closing an air bleed path communicating with a main fuel supply system and a low-speed fuel supply system and wherein said processing means selectively couples said output signal to said change-over valve and said control valve so that, as long as the amount of intake air is less than a prescribed quantity, said output signal causes the degree of opening of said control valve to increase and said change-over valve to close said air bleed path and, upon said amount of intake air reaching said prescribed quantity, said output signal causes the degree of opening of said control valve to remain unchanged and said change-over valve to open said air bleed path.

* * * * *